(12) United States Patent
Allstrom et al.

(10) Patent No.: US 9,851,698 B2
(45) Date of Patent: Dec. 26, 2017

(54) PROCESS VARIABLE TRANSMITTER

(71) Applicant: Invensys Systems, Inc., Foxboro, MA (US)

(72) Inventors: Peter E. Allstrom, Warwick, RI (US); Jeff Stewart, Plainville, MA (US)

(73) Assignee: Schneider Electric Systems USA, Inc., Foxboro, MA (US)

( * ) Notice: Subject to any disclaimer, the term of this patent is extended or adjusted under 35 U.S.C. 154(b) by 902 days.

(21) Appl. No.: 14/213,379

(22) Filed: Mar. 14, 2014

(65) Prior Publication Data
US 2014/0277606 A1 Sep. 18, 2014

Related U.S. Application Data

(60) Provisional application No. 61/793,118, filed on Mar. 15, 2013.

(51) Int. Cl.
*G05B 11/01* (2006.01)
*G05B 23/02* (2006.01)
*G01D 3/036* (2006.01)

(52) U.S. Cl.
CPC ............ *G05B 11/01* (2013.01); *G01D 3/036* (2013.01); *G05B 23/0221* (2013.01); *G01D 3/0365* (2013.01)

(58) Field of Classification Search
CPC .... G05B 11/01; G05B 23/0221; G01D 3/036; G01D 21/00; G01D 3/0365; G01F 1/8481
See application file for complete search history.

(56) References Cited

U.S. PATENT DOCUMENTS 5,956,663 A * 9/1999 Eryurek ................. G01K 15/00
                                                374/E15.001
2001/0045134 A1* 11/2001 Henry ..................... G01F 1/74
                                                73/861.356

(Continued)

FOREIGN PATENT DOCUMENTS

| EP | 0389155 A2 | 9/1990 |
| EP | 0926470 A1 | 6/1999 |
| WO | 2012147348 A1 | 11/2012 |

OTHER PUBLICATIONS

European Search Report for 14000942.4 dated Jul. 28, 2014.

*Primary Examiner* — John Breene
*Assistant Examiner* — Mohammad Islam
(74) *Attorney, Agent, or Firm* — Stephen Manetta; Ralph Graham

(57) ABSTRACT

A process variable transmitter provides an output representing a process variable. The process variable transmitter includes a process variable sensor that provides an analog sensor signal representing a process variable, an analog to digital converter that receives the analog sensor signal from the process variable sensor and converts it to digital sensor signal values, and a compensation processor. The compensation processor calculates, in a first mode, a compensated process variable value at a first slow rate. The compensation processor calculates a compensation factor relating the compensated process variable value to an initial digital sensor signal value. The compensation processor calculates, in a second mode, a process variable estimate as a function of an updated digital sensor signal value and the compensation factor. The process variable estimate is calculated at a second rate faster than the slow rate.

15 Claims, 6 Drawing Sheets

(56) References Cited

U.S. PATENT DOCUMENTS

| | | | | |
|---|---|---|---|---|
| 2004/0249592 | A1* | 12/2004 | Koukol, Jr. | G01F 25/00 |
| | | | | 702/88 |
| 2007/0245196 | A1 | 10/2007 | Kopken | |
| 2009/0196374 | A1* | 8/2009 | Schulte | G01D 3/0365 |
| | | | | 375/296 |
| 2010/0189042 | A1* | 7/2010 | Pan | H04B 1/036 |
| | | | | 370/328 |
| 2011/0082568 | A1* | 4/2011 | Schulte | G01F 15/00 |
| | | | | 700/33 |
| 2012/0245895 | A1* | 9/2012 | Rud | G05B 23/0221 |
| | | | | 702/183 |
| 2012/0250781 | A1* | 10/2012 | Rud | H03M 1/20 |
| | | | | 375/295 |
| 2013/0012141 | A1* | 1/2013 | Harnishfeger | H03J 3/04 |
| | | | | 455/75 |
| 2013/0282145 | A1* | 10/2013 | Yeryomenko | G01D 3/021 |
| | | | | 700/10 |
| 2014/0249653 | A1* | 9/2014 | Blevins | G05B 19/058 |
| | | | | 700/21 |
| 2014/0254717 | A1* | 9/2014 | Schulte | H04B 1/0475 |
| | | | | 375/296 |

* cited by examiner

PROCESS VARIABLE TRANSMITTER

FIELD OF INVENTION

Aspects of the present invention generally relate to process variable transmitters. More particularly, aspects relate to a process variable transmitter having a process variable sensor, an analog to digital converter, and a compensation processor that provides an estimate of a compensated process variable at approximately a fast rate to significantly reduce dead time between calculations.

BACKGROUND

Process control systems for controlling factory, manufacturing, processing operations, and the like often use a control system of distributed sensors and actuators to monitor and control operations like food, chemical, or materials processing. Sensors monitor, for example, flow rate, pressure, and temperature of processed materials, while actuators, for example, control the opening of valves and the regulation of heat. A factory processing operation may rely on hundreds, or even thousands, of such sensors and actuators, with the sensors and actuators being distributed throughout the factory process site.

As process control technology has advanced, in many cases computational resources have become more distributed. Older control systems, for example, relied on highly centralized control interfaces to coordinate communication and computation for an entire process. On the other hand, many more modern control systems distribute these features among the various processors in the control system. In one example of this distribution of resources, process variable transmitters (e.g., in combination, a process variable sensor, a corresponding signal processor, and a corresponding communication interface) are being equipped with increasing onboard intelligence. An analog sensor signal can be digitized and processed (e.g., filtered, linearized, temperature-compensated, etc.) by a processor local to the transmitter. However, due to such limitations as power and processor size constraints, locally compensated process variable values are updated at slower rates than raw, unprocessed values. Thus, a process variable transmitter that provides an output representing a process variable that has been filtered, linearized, temperature-compensated, and the like at a faster rate than previously available is desired.

SUMMARY

Briefly, aspects of the present invention relate to systems and methods for increasing the rate at which a process variable transmitter provides an output representing a process variable that has been filtered, linearized, temperature-compensated, and the like. These systems and methods allow a process control network to receive an output from a transmitter representing a process variable at fast rate, such as approximately the same rate as a corresponding analog to digital converter updates digital values that represent a raw, unprocessed sensor signal from a process variable sensor. A compensation processor uses a compensation factor to quickly estimate the effects of such full compensation techniques as filtering, linearization, temperature-compensation, and the like. In this manner, the desirable result of increasing the rate at which a process variable transmitter provides an output representing a compensated process variable is met.

In one aspect of the present invention, a process variable transmitter comprises a process variable sensor configured to provide an analog sensor signal representing a process variable. An analog to digital converter is configured to receive the analog sensor signal from the process variable sensor and to convert the analog sensor signal to a digital sensor signal. A compensation processor is coupled to the analog to digital converter and configured for receiving an initial digital sensor signal value from the analog to digital converter. The compensation processor is configured for calculating, in a first mode, a compensated process variable value based on the initial digital sensor signal value. The compensated process variable is calculated in the first mode at a first rate slower than the rate at which the converter operates. The compensation processor is configured for calculating a compensation factor relating the compensated process variable value to the initial digital sensor signal value. The compensation processor is further configured for receiving an updated digital sensor signal value from the analog to digital converter at a second rate as a function of the converter rate and faster than the first rate. The compensation processor is also configured for calculating, in a second mode, a process variable estimate as a function of the updated digital sensor signal value and the compensation factor. The process variable estimate is calculated in the second mode at the second rate. The compensation processor is configured for outputting an output signal representing an estimated compensated process variable value based on at least the process variable estimate at approximately the second rate.

In another aspect of the invention, a method is performed in a compensation processer of a process variable transmitter for providing an output signal representing an estimated compensated process variable. The process variable transmitter comprises a process variable sensor configured to provide an analog sensor signal representing a process variable and an analog to digital converter configured to receive the analog sensor signal from the process variable sensor and to convert the analog sensor signal to a digital sensor signal. An initial digital sensor signal value is received from the analog to digital converter. In a first mode, a compensated process variable value is calculated based on the initial digital sensor signal value. The compensated process variable is calculated in the first mode at a first rate slower than the rate at which the converter operates. A compensation factor relating the compensated process variable value to the initial digital sensor signal value is calculated. An updated digital sensor signal value is received from the analog to digital converter at a second rate, which is a function of the converter rate and faster than the first rate. In a second mode, a process variable estimate is calculated as a function of the updated digital sensor signal value and the compensation factor. The process variable estimate is calculated in the second mode at the second rate. The output signal representing the estimated compensated process variable value based on at least the process variable estimate is output at approximately the converter rate.

In another aspect of the invention, a distributed control system comprises a controller configured to control at least a portion of a process, an input/output module coupled to the controller and configured to facilitate communication between the controller and a plurality of field devices, and a process variable transmitter. The process variable transmitter comprises a process variable sensor configured to provide an analog sensor signal representing a process variable. An analog to digital converter is configured to receive the analog sensor signal from the process variable sensor and to convert the analog sensor signal to a digital sensor signal. A compensation processor is coupled to the analog to digital converter and configured for receiving an initial digital sensor signal value from the analog to digital converter. The compensation processor is configured for calculating, in a first mode, a compensated process variable value based on the initial digital sensor signal value. The compensated process variable is calculated in the first mode at a first rate slower than the rate at which the converter operates. The compensation processor is configured for calculating a compensation factor relating the compensated process variable value to the initial digital sensor signal value. The compensation processor is further configured for receiving an updated digital sensor signal value from the analog to digital converter at a second rate, which is a faster than the first rate. The compensation processor is also configured for calculating, in a second mode, a process variable estimate as a function of the updated digital sensor signal value and the compensation factor. The process variable estimate is calculated in the second mode at the second rate. The compensation processor is configured for outputting an output signal representing the process variable estimate at approximately the second rate.

Still other aspects, embodiments, objects and features of the present invention will be apparent and in part pointed out hereinafter.

BRIEF DESCRIPTION OF THE DRAWINGS

Corresponding reference characters indicate corresponding features throughout the drawings.

DETAILED DESCRIPTION

Figure 1:
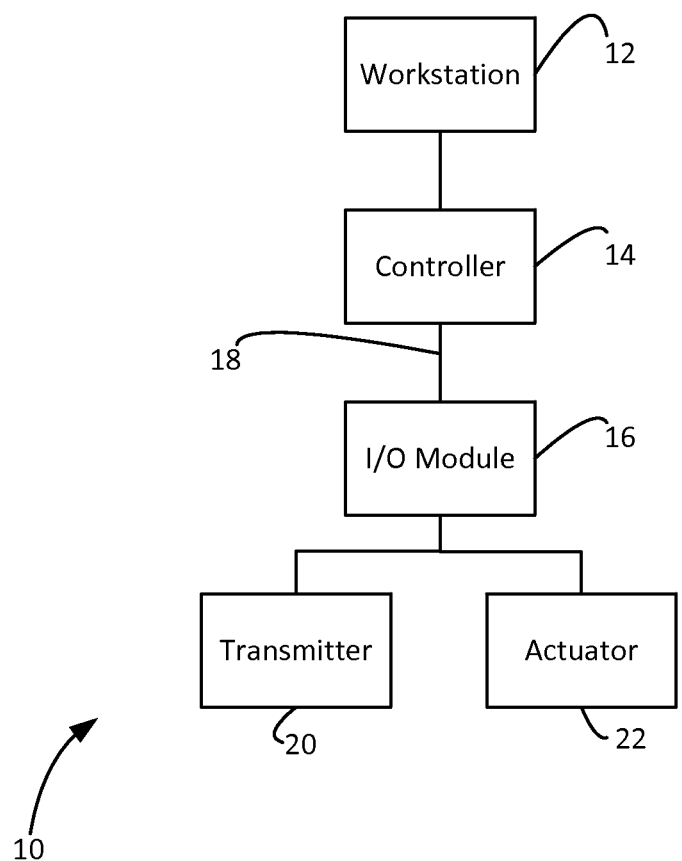
FIG. 1 is an exemplary schematic block diagram depicting a distributed control system of the present invention.

Turning now to FIG. 1, a distributed control system (DCS) embodying aspects of the invention is generally indicated at 10. In the illustrated example, the DCS 10 includes a workstation 12, a controller 14, an input/output (I/O) module 16, a process control network 18, a process variable transmitter 20, and an actuator 22. It should be understood that the DCS 10 provides only one example of a suitable environment for using the process variable transmitter 20 in accordance with an embodiment of the invention.

The workstation 12 represents an engineering workstation, personal computer, mainframe computer or other digital data processing device suitable for modeling, configuring, and/or exercising supervisory control over the control devices of the DCS 10 (e.g., controller 14, I/O module 16, process variable transmitter 20, and actuator 22). The process control network 18 provides a medium for communications, real-time or otherwise, among and/or between the elements of the DCS 10. The controller 14 typically executes control logic to carry out a control scheme in at least a portion of the DCS. In the illustrated example, only one controller 14 is shown for clarity. But distributed control systems such as DCS 10 commonly include more than one controller to distribute control responsibilities among various resources. In the illustrated DCS 10, the controller 14 communicates with the process variable transmitter 20 and the actuator 22 by way of the I/O module 16. The I/O module 16 may facilitate, for example, the scheduling of communications on a portion of the control network 18 between the controller 14, process variable transmitter 20, and actuator 22.

In a typical example, the process variable transmitter 20 senses a process variable and transmits a signal representing the process variable on the process control network. The controller 14 receives the information about the process variable from the I/O module 16 and executes locally stored control logic to render control decisions. The controller 14 may, for example, instruct that actuator 22 to take some specified action based on the information about the process variable the controller receives from the process variable transmitter 20. It should be understood that the DCS 10 is a simplified example of a modern control system. Typical DCSs may include several controllers, each connected to multiple I/O modules that facilitate communication with many more field devices (e.g., transmitters and actuators). Each of these control elements may include local resources upon which various communications and computational control functions are carried out.

Figure 2:
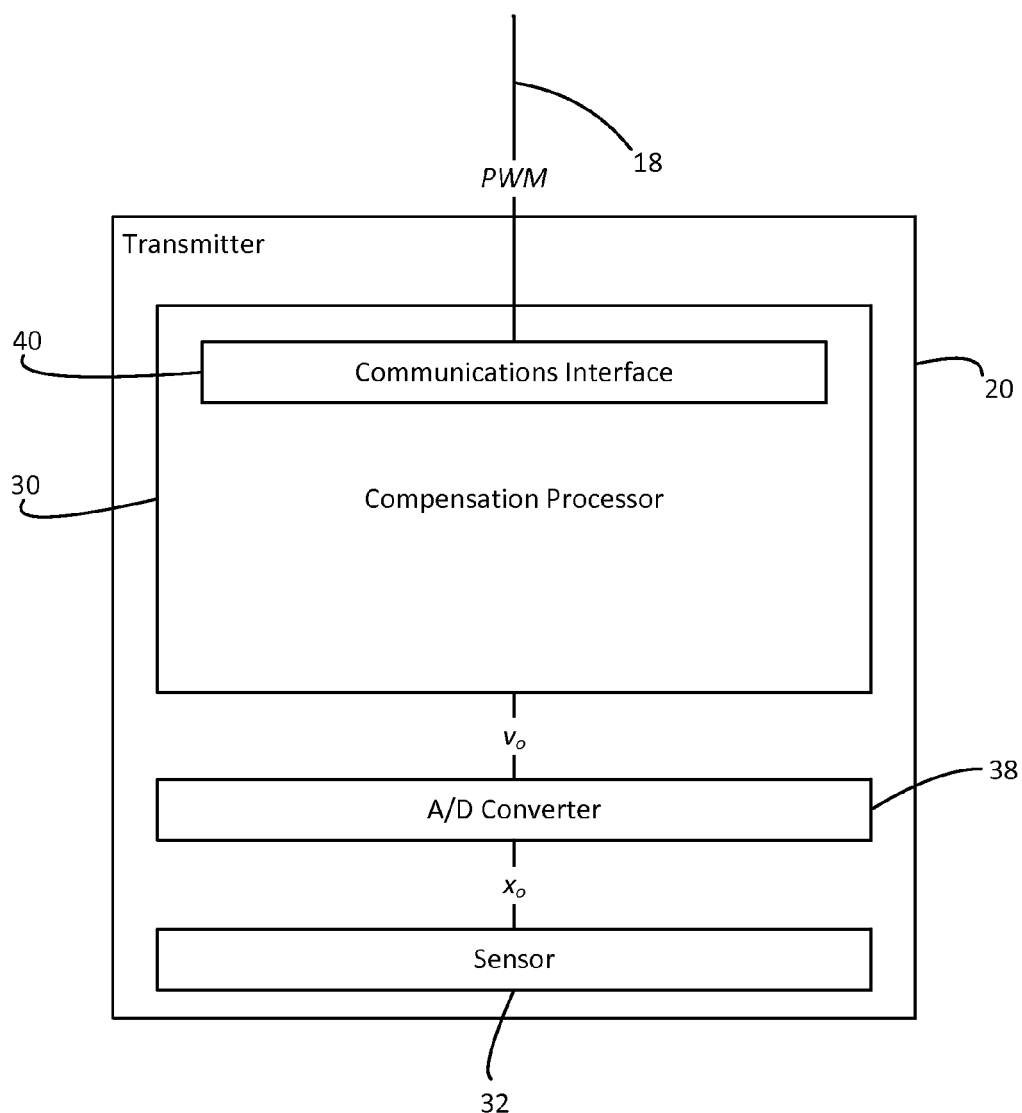
FIG. 2 is an exemplary schematic block diagram depicting an embodiment of a process variable transmitter of the present invention.

In an embodiment, as shown best in FIG. 2, the process variable transmitter 20 may include a compensation processor 30 that performs the processing necessary to generate a compensated process variable value. A compensated process variable value according to aspects of the invention is filtered, linearized, and/or temperature-compensated. It is to be understood that the compensation processor 30 is capable of performing further processing of the process variable instead of or in addition to filtering, linearizing, and/or temperature-compensating to generate the compensated process variable. In the illustrated example, the process variable transmitter 20 includes a process variable sensor 32 configured to provide an analog sensor signal $x_o$ representing a process variable. Suitable examples of process variables that may be measured using a transmitter 20 of the present invention include a pressure sensor reading. In addition, aspects of the invention apply to other transmitters, such as flow transmitters and temperature transmitters.

Figure 3:
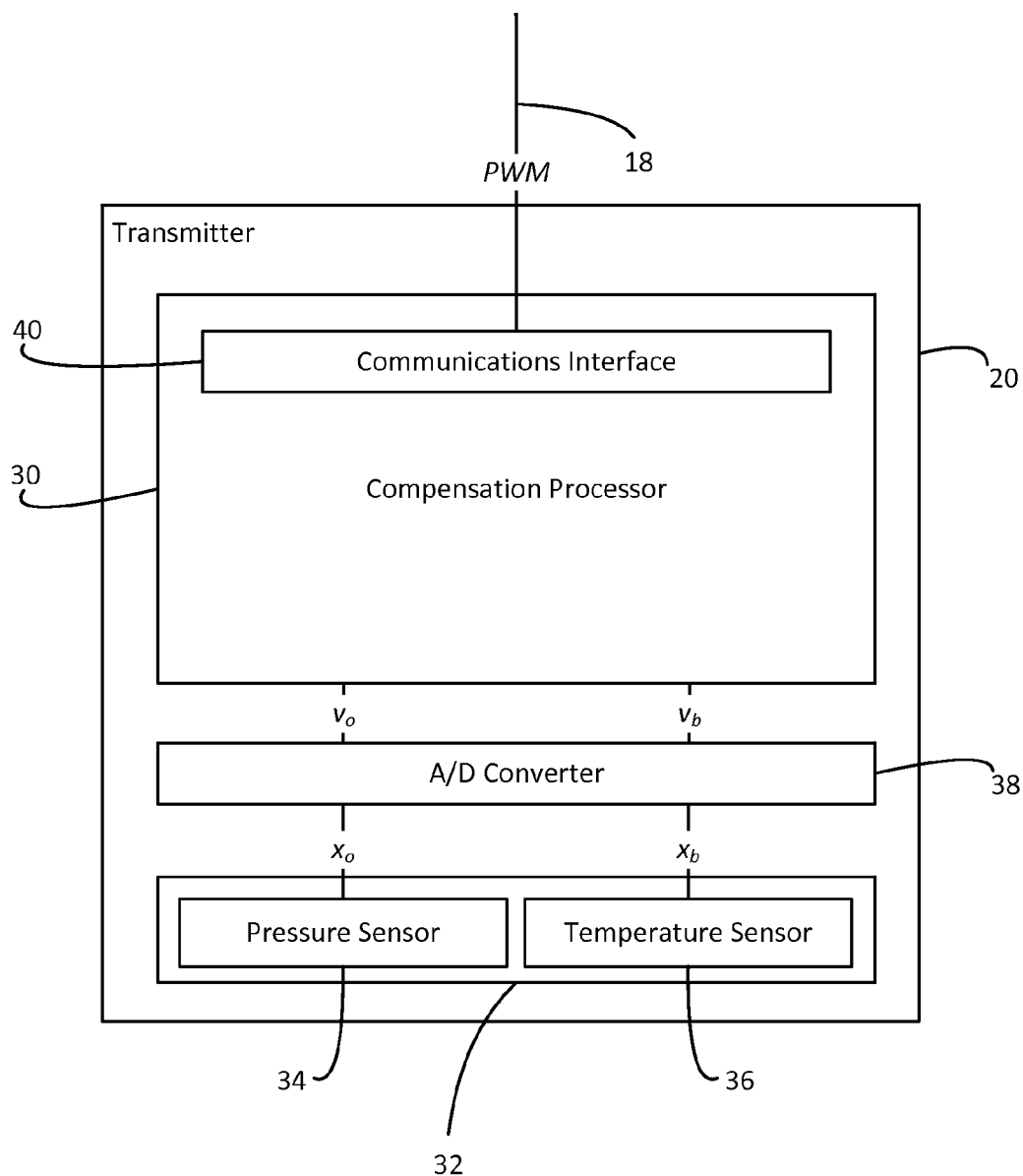
FIG. 3 is an exemplary schematic block diagram depicting another embodiment of a process variable transmitter of the present invention.

Referring now to FIG. 3, in one preferred embodiment the process variable sensor 32 includes a pressure-sensor 34 and a temperature sensor 36. In such embodiment, the process variable sensor 32 is configured to sense a process pressure to output a pressure signal $x_o$ and sense a sensor temperature to output temperature signal $x_b$. However, it should be understood that other process variable sensors suitable for providing other process variable signals may also be used without departing from the scope of the invention. An analog to digital converter 38 is coupled to the process variable sensor 32. The analog to digital converter 38 is configured to receive the analog sensor signal $x_o$ from the process variable sensor 32 and convert the analog sensor signal to a digital sensor signal $v_o$. The digital sensor signal $v_o$ generated by the analog to digital converter 38 includes digital sensor signal values $v_{o,n}$ (see FIG. 4) that are updated at a much faster rate than the slow path. In preferred embodiments, the analog to digital converter 38 updates the digital sensor signal values $v_{o,n}$ at a rate on the order of every few milliseconds (e.g., 16 milliseconds, which is half of the converter rate).

Referring further to FIG. 3, process variable transmitter 20 includes compensation processor 30, which is coupled to the analog to digital converter in the illustrated embodiment to receive the updated digital sensor signal $v_o$. As will be discussed in greater detail below, the compensation processor 30 may be configured to use the updated digital sensor signal values $v_{o,n}$ to provide a process variable estimate $y_n$ that represents the process variable. In the illustrated example, the compensation processor 20 includes a communications interface 40 configured to interface with the process control network 18, for example, using a pulse width modulated output signal PWM. In other embodiments, the compensation processor 30 may output signals using other techniques (e.g., D/A) for generating 4-20 mA outputs and/or pulse outputs as determined by the type of transmitter. Thus, the communications interface 40 may include electronic components to convert the process variable estimate $y_n$ to an analog signal that conforms to a standard understood in the DCS 10. In some embodiments, the compensation processor 30 may include resources stored on non-transitory computer readable media and executed on a micro-processor. An ARM 7 microprocessor available from STMicroelectronics is suitable for use as compensation processor 30. However, other resources and computational devices may also be used without departing from the scope of the invention.

Figure 4:
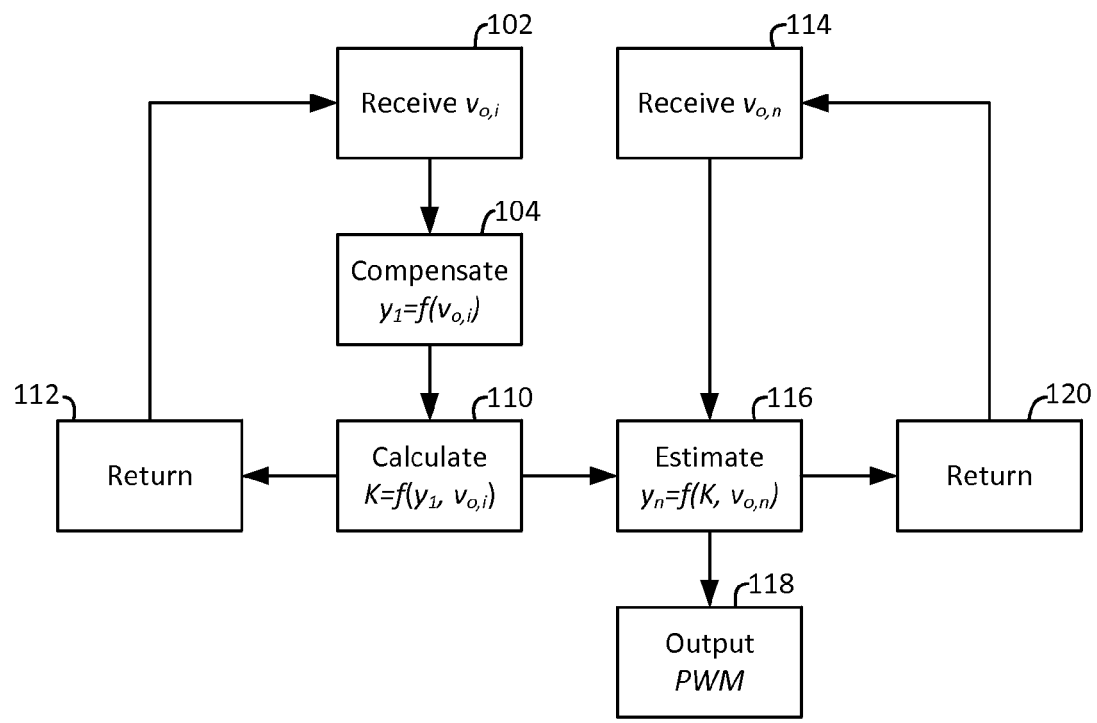
FIG. 4 is an exemplary flow diagram depicting an embodiment of a process of providing an output representing a compensated process variable.

As shown in FIG. 4, the illustrated compensation processor 30 is configured to operate simultaneously in first and second operational modes. At step 102, the compensation processor 30 receives an initial digital sensor signal value $v_{o,i}$ from the analog to digital converter 38. In the first mode, the compensation processor 30 calculates a compensated process variable value $y_1$ based on the initial digital sensor signal value $v_{o,i}$ (step 104). In suitable embodiments, the compensation processor 30 performs a full compensation of the initial digital sensor signal value $v_{o,i}$ at step 104 to generate the compensated process variable value $y_1$. As will be discussed in more detail below, in some embodiments, a full compensation technique performed at step 104 may include steps such as linearization, normalization, damping adjustments, calibration, unit conversions, temperature compensation, etc. In the illustrated embodiment, the process variable transmitter may be loop powered. As a result of the limited power available to the compensation processor 30, the full compensation technique of step 104 takes considerable time (e.g., on the order of 250 milliseconds compared to a converter rate of about an order of magnitude faster).

In the first mode representing a slow path, the compensated process variable value $y_1$ is calculated at a first rate that is slower than the converter rate (i.e., step 104 is repeated with new initial digital sensor signal values $v_{o,i}$ at the first rate). In an embodiment, the slow path values are updated according to a schedule, such as four or five times per second. In other words, the rate at which the slow path updates, i.e., the first rate in this embodiment, is about once every 200 or 250 milliseconds. Thus, compared to the relatively fast converter rate, the first rate may be much slower. In some embodiments, the compensated process variable value $y_1$ updates at a first rate. As a result, the analog to digital converter 38 updates the digital sensor signal value $v_{o,n}$ in the range of, for example, about 10 times as frequently as the compensation processor 30 updates the compensated process variable value $y_1$. The compensation processor 30 is unable to calculate a compensated process variable value $y_1$ for each updated digital sensor signal value $v_{o,n}$ it receives from the analog to digital converter 38. A typical converter rate is 123 Hz. In an embodiment, compensation processor 30 obtains digital sensor signal $v_o$, obtains another measurement, obtains digital sensor signal $v_o$, and so forth. As such, the rate at which the digital sensor signal values $v_{o,n}$ are updated is, for example, half the converter rate, or approximately every 16 milliseconds.

To overcome this limitation, at step 106 the compensation processor 30 calculates a compensation factor K relating the compensated process variable value $y_1$ to the initial digital sensor signal value $v_{o,i}$. In the illustrated example, the compensation processor 30 calculates the compensation factor K (step 110) in the first mode of operation, though it is contemplated that the compensation factor could be calculated in another mode of operation without departing from the scope of the invention. In the illustrated embodiment, the compensation processor 30 updates the compensation factor K at the first rate (i.e., the rate at which the compensated process variable value $y_1$ is updated). Preferably, the compensation factor K can be used to estimate the compensated process variable more quickly than by using the full compensation technique 104. Once the compensation processor 30 finishes calculating the compensation factor K (step 110), it may execute step 112 to return to step 102 and receive a new initial digital sensor signal value $v_{o,i}$.

At step 114, the compensation processor 30 receives an updated digital sensor signal value $v_{o,n}$ from the analog to digital converter 38 as determined by the converter rate. In a second mode of operation at step 116, the compensation processor 30 calculates a process variable estimate $y_n$ as a function of the updated digital sensor signal value $v_{o,n}$ and the compensation factor K. Compared to the first mode, the second mode of operation represents a fast path. Because the compensation factor K simplifies the calculations required to generate a reasonable estimate of a fully compensated process variable, the process variable estimate $y_n$ may be calculated at a second rate related to the converter rate and much faster than the slow path rate. In a preferred embodiment, at step 116, the process variable estimate $y_n$ may be calculated at a second rate that is equal to the converter rate, such that each updated digital sensor signal value $v_{o,n}$ may be used to generate a process variable estimate $y_n$. In another preferred embodiment, at step 116, the process variable estimate $y_n$ may be calculated at a second rate that is equal to half the converter rate. Thus, each time the compensation processor calculates the process variable estimate $y_n$, it may execute step 120 and return to step 114 where it receives an updated digital sensor signal value $v_{o,n}$. At step 118, the compensation processor 30 may be configured to output an output signal PWM representing an estimated process variable value based on at least the process variable estimate $y_n$ at the second rate. In a preferred embodiment the output signal PWM may be output to the process control network 18 at a rate equal to the second rate such that the DCS 10 receives an updated process variable estimate $y_n$ for each updated digital sensor signal value $v_{o,n}$.

Figure 5:
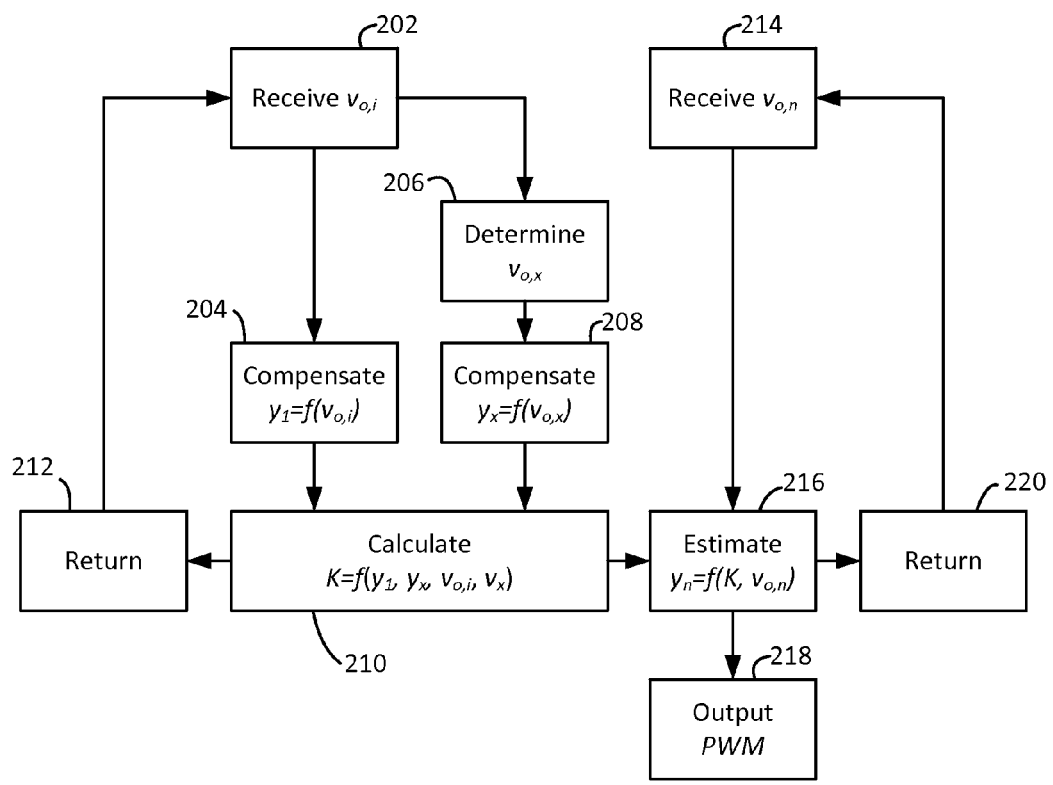
FIG. 5 is an exemplary flow diagram depicting another embodiment of a process of providing an output representing a compensated process variable.

As shown best in FIG. 5, in some embodiments the compensation processor 30 may be configured to determine a proxy digital sensor signal value $v_x$ to use in calculating the compensation factor K. In an embodiment, the proxy value is a "snapshot" value used for calculation purposes. At step 202, the compensation processor 30 receives an initial digital sensor signal value $v_{o,i}$. As above, at step 204, the compensation processor 30 preforms a full set of compensation calculations to calculate a compensated process variable value $y_1$ based on the initial digital sensor signal value $v_{o,n}$. However, as the compensated process variable value $y_1$ is being calculated, at step 206 the compensation processor also determines a proxy digital sensor signal value $v_{o,x}$. Preferably, the proxy digital sensor signal value $v_{o,x}$ is different than the initial digital sensor signal value $v_{o,i}$.

In some embodiments, the proxy digital sensor signal value $v_{o,x}$ is plus or minus a percentage of the range of the transmitter 20 from the initial digital sensor signal value $v_{o,i}$. As one skilled in the art will appreciate, the range of the transmitter 20 may be stored in a local memory, and the percentage of the range may be calculated using well-understood techniques. For example, in a suitable embodiment, the proxy digital sensor signal value $v_{o,x}$ is calculated to be plus or minus 25% of the range of the transmitter 20 from the initial digital sensor signal value $v_{o,x}$. If the initial digital sensor signal value $v_{o,i}$ is, for example, greater than 50% of the range of the transmitter 20, the proxy digital sensor signal value is determined to be the initial digital sensor signal value, minus 25% of the range of the transmitter. If the initial digital sensor signal value $v_{o,i}$ is, for example, less than 50% of the range of the transmitter 20, the proxy digital sensor signal value is determined to be the initial digital sensor signal value, plus 25% of the range of the transmitter.

In preferred embodiments, the proxy digital sensor signal value $v_{o,x}$ may be chosen such that a proxy compensated process variable value $y_x$ may be calculated with a reasonable degree of accuracy (e.g., for transmitters with primarily linear compensation responses, the percentage value may be chosen such that the relationship between the initial digital sensor signal value $v_{o,i}$ the proxy digital sensor signal value $v_{o,x}$, and their respective compensated process variable values $y_1$, $y_x$ would be expected to be primarily linear).

Referring further to FIG. 5, at step 208, the compensation processor 30 calculates a proxy compensated process variable value $y_x$ based on the proxy digital sensor signal value $v_{o,x}$. The proxy compensated process variable value $y_x$ may be calculated using the same compensation techniques used in calculating the compensated process variable value $y_1$. In one embodiment, stored procedures may be stored on one or more non-transitory computer readable media that when executed perform a full compensation technique. Thus, in the illustrated first mode of operation, the compensation processor 30 is capably of using the same stored procedures to perform the full compensation techniques twice, once to compensate the initial digital sensor signal value $v_{o,i}$ and once to compensate the proxy digital sensor signal value $v_{o,x}$.

Using the initial digital sensor signal value $v_{o,i}$, proxy digital sensor signal value $v_{o,x}$ compensated process variable value $y_1$, and proxy compensated process variable value $y_x$, at step 210, the compensation processor 30 is configured in an embodiment to calculate a compensation factor K. In the illustrated embodiment, the compensation processor is configured to calculate the compensation factor K as a ratio of a first difference to a second difference. The first difference may be a difference between the compensated process variable value $y_1$ and the proxy compensated process variable value $y_x$, and the second difference may be a difference between the initial digital sensor signal value $v_{o,i}$ and the proxy digital sensor signal value $v_{o,x}$. Thus, in some embodiments, at step 210, the compensation factor K may be calculated according to equation (1):

$$K = \frac{y_1 - y_x}{v_{o,1} - v_{o,x}} \quad (1)$$

As above, once the compensation factor K has been calculated in step 210, the compensation processor 30 may proceed to step 212 and return to step 202 where it receives a new initial digital sensor signal value $v_{o,i}$ and proceeds through steps 204-210 using the new initial digital sensor signal value. Meanwhile, in the second mode of operation, the compensation processor 30 receives each updated digital sensor signal value $v_{o,n}$ at step 214. Using each updated digital sensor signal value $v_{o,n}$ and the current compensation factor K, the compensation processor calculates a process variable estimate $y_n$ at step 216. In some embodiments, the process variable estimate $y_n$ may be calculated according to equation (2):

$$y_n = y_1 + K(v_{o,n} - v_{o,1}) \quad (2)$$

Equations (1) and (2) are particularly suitable when the compensated process variable y is a primarily linear function of the digital sensor signal v. For example, when the digital sensor signal $v_o$ is a signal representing an uncompensated differential pressure and the compensated process variable y represents a compensated differential pressure, the relationship between the compensated process variable and the digital process variable signal may be primarily linear. However, when the digital sensor signal $v_o$ is a signal representing an uncompensated differential pressure and the compensated process variable y represents a compensated flow measurement (as is well understood in the art, a fluid's flow rate varies as a function of the square of the differential pressure across a differential producer), the linear equations for calculating a compensation factor K and a process variable estimate $y_n$ may be inaccurate.

It is contemplated that other sets of equations may be used when the compensated process variable y is not a primarily linear function of the digital sensor signal $v_o$ without departing from the scope of the invention. In any case, once the process variable estimate $y_n$ is calculated, an output signal, such as the pulse width modulated signal PWM may be output to the control network 18 at step 218. Likewise, once the compensated process variable estimate $y_n$ is calculated, at step 220, the compensation processor 30 may return to step 214 where it receives an updated digital sensor signal value $v_{o,n}$ which may be used in repeating steps 216-218 for the current compensation factor K.

Figure 6:
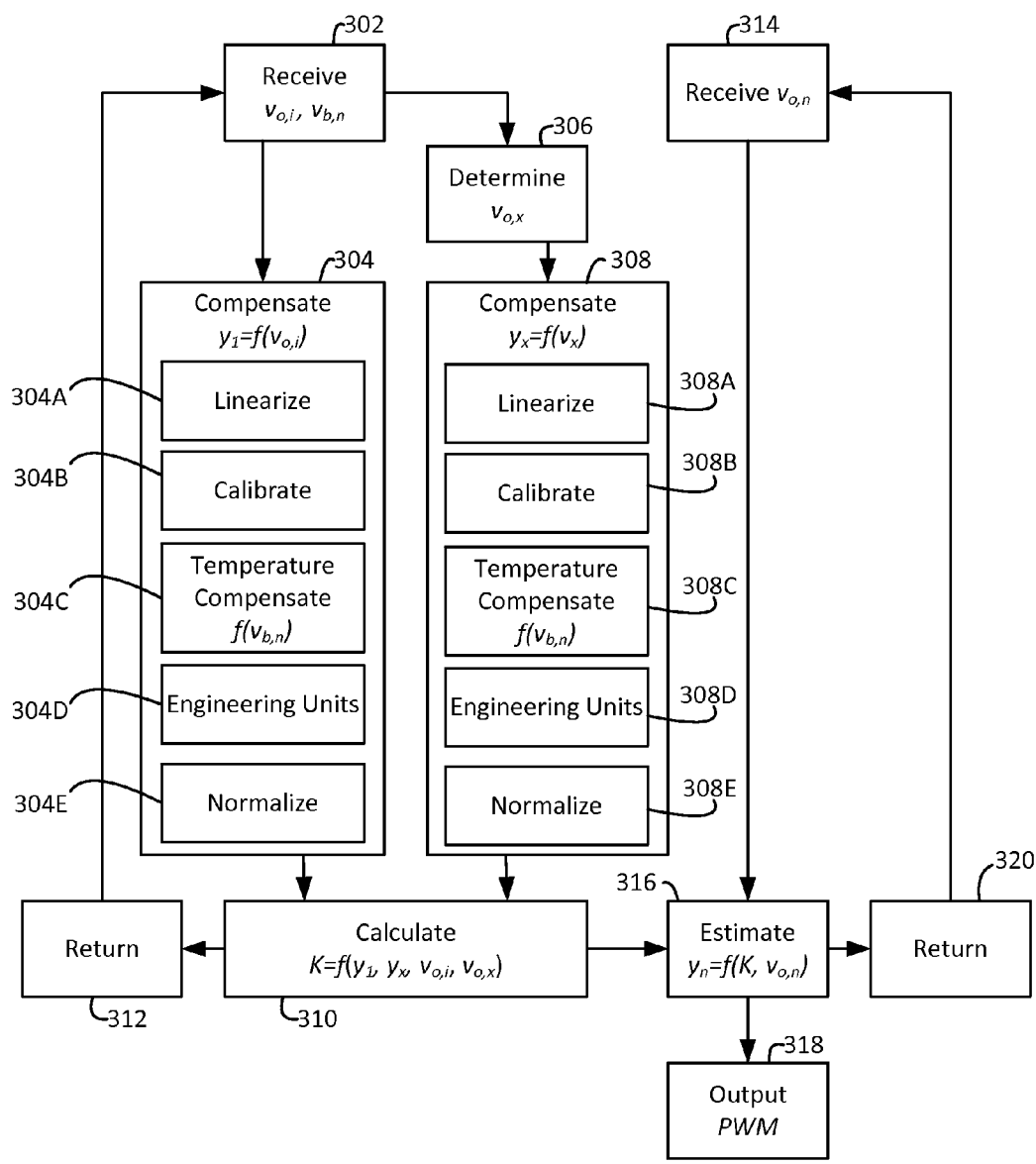
FIG. 6 is an exemplary flow diagram depicting another embodiment of a process of providing an output representing a compensated process variable.

As shown best in FIG. 3 and FIG. 6, in some embodiments, the process variable sensor 32 may include a dedicated process variable sensor, such as pressure sensor 34 and a temperature sensor 36. In the illustrated embodiment, the sensor 32 is representative of a Wheatstone bridge-type pressure sensor arrangement, which is well-known to those skilled in the art and includes a pressure-responsive element (i.e., the dedicated process variable sensor 34) and a temperature-responsive element (i.e., the temperature sensor 36). As discussed above, the dedicated process variable sensor 34 is configured to output an analog sensor signal $x_o$, and the temperature sensor 36 is configured to output an analog temperature signal $x_b$. The analog to digital converter 38 is configured to receive both the analog sensor signal $x_o$ and the analog temperature signal $x_b$. The analog to digital converter 38 converts the analog sensor signal $x_o$ to a digital sensor signal $v_o$ and converts the analog temperature signal $x_b$ to a digital temperature signal $v_b$. The compensation processor 30 is configured, for example, to receive digital sensor signal values $v_{o,n}$ updated by the analog to digital converter 38 at the second rate. Likewise, in this example compensation processor 30 is configured to receive digital temperature signal values $v_{b,n}$ updated by the analog to digital converter 38 at the converter rate. However, the digital temperature signal values may be updated at a rate slower than the converter rate (e.g., the first rate) without departing from the scope of the invention.

As shown in FIG. 6, in a first mode the compensation processor 30 is preferably configured to receive an initial digital sensor signal value $v_{o,i}$ and a corresponding (e.g., in time) one of the digital temperature signal values $v_{b,n}$ (step 302). As above, the compensation processor 30 performs in the illustrated embodiment a full compensation technique 304 based on the digital sensor signal value $v_{o,i}$ and the corresponding one of the digital temperature signal values $v_{b,n}$ to calculate a compensated process variable value $y_1$. In the illustrated embodiment, the full compensation technique 304 includes a linearizing step 304A, a calibration step 304B, temperature compensation step 304C, a unit conversion step 304D, and a normalization step 304E. It should be understood that other full compensation techniques may add or omit steps from those shown in the full compensation technique 304 without departing from the scope of the invention. In the illustrated example, the corresponding one of the digital temperature signal values $v_{b,n}$ is used in the temperature compensation step 304C. At step 306, a proxy digital sensor signal value $v_{o,x}$ may be calculated in accordance with the techniques set forth above. Likewise, at step 308, a proxy compensated process variable value $y_x$ may be calculated using the compensation steps 308A-308E, which correspond to the compensation steps 304A-304E.

Referring further to FIG. 6, no proxy for the digital temperature signal value $v_{b,n}$ is used during the compensation step 308. Rather, to generate a proxy compensated process variable value $y_x$, the same temperature signal value $v_{b,n}$ is used in both temperature compensation steps 304C and 308C. In this way, the proxy compensated process variable value $y_x$ simulates the same conditions used in calculating the compensated process variable value $y_1$. Using the compensated process variable value $y_1$ and the proxy compensated process variable value $y_x$, the compensation factor K may be calculated (step 310), for example, in accordance with the techniques described above. After calculating the compensation factor K, the compensation processor 30 may execute the return step 312 and return to step 302 where it receives a new initial digital sensor signal value $v_{o,i}$ and a new corresponding digital temperature signal value $v_{b,n}$ and proceeds through steps 304-310 using the new values.

Meanwhile, in the second mode of operation, the compensation processor 30 receives each updated digital sensor signal value $v_{o,n}$ at step 314. Using each updated digital sensor signal value $v_{o,n}$ and the current compensation factor K, the compensation processor calculates a process variable estimate $y_n$ at step 316. Once the process variable estimate $y_n$ is calculated, an output signal, such as the pulse width modulated signal PWM may be output to the control network 18 in step 318. Likewise, once the process variable estimate $y_n$ is calculated, at step 320, the compensation processor 30 may return to step 314 where it receives an updated digital process variable value $v_{o,n}$ which may be used in repeating steps 316-318 for the current compensation factor K. In the second mode of operation, the compensation processor 30 is capable of receiving many updated digital sensor signal values $v_{o,n}$ for each updated compensation factor K that it receives. Because the second mode of operation does not take into account updated digital temperature signal values $v_{b,n}$ in this embodiment, the process variable estimate $y_n$ is estimated based on the temperature signal value corresponding with the initial digital sensor signal value $v_{o,i}$ upon which the calculation of the compensation factor K was based. It is believed that, under most circumstances, the temperature of the sensor 32 may change more slowly than the process variable. Moreover, a change in the digital temperature signal $v_b$ typically has less effect on the compensated process variable y than a change in the digital sensor signal $v_o$. Thus, it is believed that the improved response time for calculating the process variable estimate $y_n$ outweighs the detrimental effects of ignoring the most current temperature sensor signal value $v_{b,n}$.

Advantageously, aspects of the invention essentially eliminate processing dead time. That is operating in both the first and second modes, i.e., the slow and fast paths, simultaneously, removes dead time related to slow path calculations. Over time, the fast path produces the same answer as the slow path because the delta goes to zero. But it does so at a much faster rate, effectively reducing dead time (e.g., a 10 to 1 reduction in time.)

The Abstract and summary are provided to help the reader quickly ascertain the nature of the technical disclosure. They are submitted with the understanding that they will not be used to interpret or limit the scope or meaning of the claims. The summary is provided to introduce a selection of concepts in simplified form that are further described in the Detailed Description. The summary is not intended to identify key features or essential features of the claimed subject matter, nor is it intended to be used as an aid in determining the claimed subject matter.

Although described in connection with an exemplary computing system environment, embodiments of the aspects of the invention are operational with numerous other general purpose or special purpose computing system environments or configurations. The computing system environment is not intended to suggest any limitation as to the scope of use or functionality of any aspect of the invention. Moreover, the computing system environment should not be interpreted as having any dependency or requirement relating to any one or combination of components illustrated in the exemplary operating environment.

Embodiments of the aspects of the invention may be described in the general context of data and/or processor-executable instructions, such as program modules, stored on one or more tangible, non-transitory storage media and executed by one or more processors or other devices. Generally, program modules include, but are not limited to, routines, programs, objects, components, and data structures that perform particular tasks or implement particular abstract data types. Aspects of the invention may also be practiced in distributed computing environments where tasks are performed by remote processing devices that are linked through a communications network. In a distributed computing environment, program modules may be located in both local and remote storage media including memory storage devices.

In operation, processors, computers and/or servers may execute the processor-executable instructions (e.g., software, firmware, and/or hardware) such as those illustrated herein to implement aspects of the invention.

Embodiments of the aspects of the invention may be implemented with processor-executable instructions. The processor-executable instructions may be organized into one or more processor-executable components or modules on a tangible processor readable storage medium. Aspects of the invention may be implemented with any number and organization of such components or modules. For example, aspects of the invention are not limited to the specific processor-executable instructions or the specific components or modules illustrated in the figures and described herein. Other embodiments of the aspects of the invention may include different processor-executable instructions or components having more or less functionality than illustrated and described herein.

The order of execution or performance of the operations in embodiments of the aspects of the invention illustrated and described herein is not essential, unless otherwise specified. That is, the operations may be performed in any order, unless otherwise specified, and embodiments of the aspects of the invention may include additional or fewer operations than those disclosed herein. For example, it is contemplated that executing or performing a particular operation before, contemporaneously with, or after another operation is within the scope of aspects of the invention.

Throughout the specification and claims, terms such as "item," "element," "object," etc. may be used interchangeably to generically describe or identify software or display features unless otherwise indicated.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that several advantages of the aspects of the invention are achieved and other advantageous results attained.

Not all of the depicted components illustrated or described may be required. In addition, some implementations and embodiments may include additional components. Variations in the arrangement and type of the components may be made without departing from the spirit or scope of the claims as set forth herein. Additional, different or fewer components may be provided and components may be combined. Alternatively or in addition, a component may be implemented by several components.

The above description illustrates the aspects of the invention by way of example and not by way of limitation. This description enables one skilled in the art to make and use the aspects of the invention, and describes several embodiments, adaptations, variations, alternatives and uses of the aspects of the invention, including what is presently believed to be the best mode of carrying out the aspects of the invention. Additionally, it is to be understood that the aspects of the invention is not limited in its application to the details of construction and the arrangement of components set forth in the following description or illustrated in the drawings. The aspects of the invention are capable of other embodiments and of being practiced or carried out in various ways. Also, it will be understood that the phraseology and terminology used herein is for the purpose of description and should not be regarded as limiting.

Having described aspects of the invention in detail, it will be apparent that modifications and variations are possible without departing from the scope of aspects of the invention as defined in the appended claims. It is contemplated that various changes could be made in the above constructions, products, and methods without departing from the scope of aspects of the invention. In the preceding specification, various preferred embodiments have been described with reference to the accompanying drawings. It will, however, be evident that various modifications and changes may be made thereto, and additional embodiments may be implemented, without departing from the broader scope of the aspects of the invention as set forth in the claims that follow. The specification and drawings are accordingly to be regarded in an illustrative rather than restrictive sense.

What is claimed is:

1. A process variable transmitter comprising:
   a process variable sensor configured to provide an analog sensor signal representing a process variable;
   a temperature sensor configured to provide an analog temperature signal;
   an analog to digital converter configured to receive the analog sensor signal from the process variable sensor and to convert the analog sensor signal to a digital sensor signal, the analog to digital converter operating at a converter rate; and
   a compensation processor coupled to the analog to digital converter and configured for:
      receiving an initial digital sensor signal value from the analog to digital converter;
      calculating, in a first mode, a compensated process variable value based on the initial digital sensor signal value, wherein the compensated process variable is calculated in the first mode at a first rate slower than the converter rate;
      determining a proxy compensated process variable value;
      calculating a compensation factor as a function of the compensated process variable value and the proxy compensated process variable value, wherein the digital sensor signal values are updated at a second rate as a function of the converter rate and faster than the first rate;
      receiving an updated digital sensor signal value from the analog to digital converter at the second rate;
      calculating, in a second mode, a process variable estimate as a function of the updated digital sensor signal value and the compensation factor, wherein the process variable estimate is calculated in the second mode at the second rate; and
      outputting an output signal representing an estimated compensated process variable value based on at least the process variable estimate at approximately the second rate;
   wherein the analog to digital converter is further configured to receive the analog temperature signal and to convert the analog temperature signal to a digital temperature signal, the digital temperature signal including digital temperature signal values being updated at the second rate.

2. The process variable transmitter of claim 1 wherein the compensation processor is further configured for calculating the compensation factor at the first rate.

3. The process variable transmitter of claim 1 wherein the output signal is a 4 to 20 mA signal.

4. The process variable transmitter of claim 1 wherein calculating the compensated process variable value includes linearizing the digital sensor signal.

5. The process variable transmitter of claim 1 wherein the compensation processor is further configured to temperature-compensate the initial digital sensor signal value as a function of a corresponding one of the digital temperature signal values to calculate the compensated process variable.

6. The process variable transmitter of claim 1 wherein the process transmitter is loop powered.

7. The process variable transmitter of claim 1 wherein the compensation processor is further configured to determine a proxy digital sensor signal value, the proxy digital sensor signal value being different from the initial digital sensor signal value.

8. The process variable transmitter of claim 7 wherein the compensation processor is further configured to calculate the proxy compensated process variable value based on the proxy digital sensor signal value.

9. The process variable transmitter of claim 8 wherein the compensation processor is configured to use stored procedures to calculate the compensated process variable value based on the initial digital sensor signal value and to use said stored procedures to calculate the proxy compensated process variable value based on the proxy digital sensor signal value.

10. The process variable transmitter of claim 8 wherein the compensation processor is further configured to calculate the compensation factor as ratio of a first difference to a second difference, the first difference being a difference between the compensated process variable value and the proxy compensated process variable value and the second difference being a difference between the initial digital sensor signal value and the proxy digital sensor signal value.

11. A method performed in a compensation processer of a process variable transmitter for providing an output signal representing an estimated compensated process variable, the process variable transmitter comprising a process variable sensor configured to provide an analog sensor signal representing a process variable and an analog to digital converter configured to receive the analog sensor signal from the process variable sensor and to convert the analog sensor signal to a digital sensor signal, the analog to digital converter operating at a converter rate, the method comprising:
receiving an initial digital sensor signal value from the analog to digital converter;
determining a proxy digital sensor signal value, the proxy digital sensor signal value being different from the initial digital sensor signal value;
calculating, in a first mode, a compensated process variable value based on the initial digital sensor signal value, wherein the compensated process variable is calculated in the first mode at a first rate slower than the converter rate;
determining a proxy compensated process variable value by calculating the proxy compensated process variable value based on the proxy digital sensor signal value;
calculating a compensation factor as a function of the compensated process variable value and the proxy compensated process variable value by calculating the compensation factor as ratio of a first difference to a second difference, the first difference being a difference between the compensated process variable value and the proxy compensated process variable value and the second difference being a difference between the initial digital sensor signal value and the proxy digital sensor signal value, wherein the digital sensor signal values are updated at a second rate as a function of the converter rate and faster than the first rate;
receiving an updated digital sensor signal value from the analog to digital converter at the second rate;
calculating, in a second mode, a process variable estimate as a function of the updated digital sensor signal value and the compensation factor, wherein the process variable estimate is calculated in the second mode at the second rate; and
outputting the output signal representing the estimated compensated process variable value based on at least the process variable estimate at approximately the second rate.

12. The method of claim 11 further comprising using stored procedures to calculate the compensated process variable value based on the initial digital sensor signal value and using said stored procedures to calculate the proxy compensated process variable value based on the proxy digital sensor signal value.

13. The method of claim 11 wherein the process variable transmitter further comprises a temperature sensor configured to provide an analog temperature signal and wherein the analog to digital converter is further configured to receive the analog temperature signal and to convert the analog temperature signal to a digital temperature signal, the digital temperature signal including digital temperature signal values being updated at the second rate.

14. The method of claim 13 further comprising temperature-compensating the initial digital sensor signal value as a function of a corresponding one of the digital temperature signal values to calculate the compensated process variable.

15. A distributed control system comprising:
a controller configured to control a process;
an input/output module coupled to the controller and configured to facilitate communication between the controller and a plurality of field devices;
a process variable transmitter comprising:
a process variable sensor configured to provide an analog sensor signal representing a process variable;
an analog to digital converter configured to receive the analog sensor signal from the process variable sensor and to convert the analog sensor signal to a digital sensor signal, the analog to digital converter operating at a converter rate;
and a compensation processor coupled to the analog to digital converter and configured for: receiving an initial digital sensor signal value from the analog to digital converter;
determining a proxy digital sensor signal value, the proxy digital sensor signal value being different from the initial digital sensor signal value;
calculating, in a first mode, a compensated process variable value based on the initial digital sensor signal value, wherein the compensated process variable is calculated in the first mode at a first rate slower than the converter rate;
determining a proxy compensated process variable value by calculating the proxy compensated process variable value based on the proxy digital sensor signal value;
calculating a compensation factor as a function of the compensated process variable value and the proxy compensated process variable value by calculating the compensation factor as ratio of a first difference to a second difference, the first difference being a difference between the compensated process variable value and the proxy compensated process variable value and the second difference being a difference between the initial digital sensor signal value and the proxy digital sensor signal value, wherein the digital sensor signal values are updated at a second rate as a function of the converter rate and faster than the first rate;
receiving an updated digital sensor signal value from the analog to digital converter at the second rate;
calculating, in a second mode, a process variable estimate as a function of the updated digital sensor signal value and the compensation factor, wherein the process variable estimate is calculated in the second mode at the second rate;
and outputting an output signal representing the process variable estimate at approximately the second rate;
and an actuator operatively connected to the controller;

the controller being configured to adjust the actuator based on the output signal to control said process using the actuator.

\* \* \* \* \*